(12) United States Patent
Hoisignton et al.

(10) Patent No.: US 6,848,650 B2
(45) Date of Patent: Feb. 1, 2005

(54) GROUND EFFECT AIRPLANE

(75) Inventors: Zachary C. Hoisignton, Long Beach, CA (US); Blaine K. Rawdon, San Pedro, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/055,411

(22) Filed: Oct. 29, 2001

(65) Prior Publication Data

US 2003/0080243 A1 May 1, 2003

(51) Int. Cl.$^7$ .................... B64C 29/00; B64C 25/04; B60V 3/08
(52) U.S. Cl. ............... 244/13; 244/118.1; 244/100 R; 180/116
(58) Field of Search .................. 244/34 R, 35 R, 244/36, 47, 49, 45 R, 100 R, 2, 50, 118.1, 13, 119; 180/116, 126

(56) References Cited

U.S. PATENT DOCUMENTS

| | | | | |
|---|---|---|---|---|
| 2,010,817 A | * | 8/1935 | Henry | 244/107 |
| D139,634 S | * | 12/1944 | Walker | D12/333 |
| 2,557,962 A | * | 6/1951 | Greene | 244/118.2 |
| 3,488,020 A | * | 1/1970 | Scherer | 244/50 |
| 3,627,235 A | | 12/1971 | Lippisch | |
| 3,653,615 A | * | 4/1972 | Spence | 244/137.1 |
| 3,726,493 A | * | 4/1973 | Muller | 244/2 |
| 3,741,504 A | * | 6/1973 | Alberti et al. | 244/137.1 |
| 3,774,864 A | * | 11/1973 | Hurkamp | 244/13 |
| 3,869,102 A | * | 3/1975 | Carroll | 244/36 |
| 4,036,455 A | | 7/1977 | Whitener | |
| 4,143,841 A | | 3/1979 | Roeder | |
| 4,151,893 A | | 5/1979 | Mantle | |
| 4,159,086 A | * | 6/1979 | Schonfelder | 244/12.1 |
| 4,638,962 A | * | 1/1987 | Gunter et al. | 244/203 |
| 4,725,020 A | * | 2/1988 | Whitener | 244/76 R |
| 5,034,751 A | * | 7/1991 | Miller, Jr. | 342/368 |
| 5,083,727 A | | 1/1992 | Pompei et al. | |
| 5,088,661 A | | 2/1992 | Whitener | |
| 5,335,742 A | * | 8/1994 | Blum | 180/117 |
| 5,427,329 A | * | 6/1995 | Renzelmann et al. | 244/49 |
| 5,636,702 A | * | 6/1997 | Kolacny | 180/122 |
| 5,759,005 A | * | 6/1998 | Roessner et al. | 414/280 |
| 5,850,990 A | * | 12/1998 | Gevers | 244/105 |
| 5,893,535 A | * | 4/1999 | Hawley | 244/119 |
| 6,029,929 A | | 2/2000 | Blum et al. | |
| 6,070,831 A | * | 6/2000 | Vassiliev et al. | 244/120 |
| 6,325,011 B1 | * | 12/2001 | Klem | 114/272 |
| 6,394,392 B1 | * | 5/2002 | Lafferty | 244/118.1 |

FOREIGN PATENT DOCUMENTS

WO   WO 99/54181   * 10/1999

OTHER PUBLICATIONS

"Hughes Flying Boat Specifications" of the Evergreen Aviation Museum and located at <www.sprucegoose.org>.*

* cited by examiner

Primary Examiner—Robert P. Swiatek
(74) Attorney, Agent, or Firm—Harness Dickey & Pierce P.L.C.

(57) ABSTRACT

An extremely large aircraft which is suitable for overseas cargo transport and which includes a fuselage defining a central storage cavity, a wing assembly defining a pair of wing storage cavities, an altitude control system, and a plurality of independently steerable landing gear units. The central storage cavity has a length, height and width of at least 100 feet, at least 16 feet and at least 24 feet, respectively. The wing assembly has a wingspan of at least 300 feet and is configured with a moderate aspect ratio to permit both ground-effect and high altitude operation. The altitude control system controls the aircraft in ground effect such that the aircraft is maintained at about a predetermined altitude. The landing gear units are coupled to the fuselage and are arranged in at least two discrete columns and at least ten discrete rows. The central storage cavity and the wing storage cavities are configured to receive cargo including intermodal re-usable cargo containers.

50 Claims, 7 Drawing Sheets

GROUND EFFECT AIRPLANE

FIELD OF THE INVENTION

The present invention generally relates to a vehicle for overseas and overland cargo transport and more particularly to a ground-effect aircraft that is configured to permit the relatively efficient, rapid and cost-effective overseas and overland transport of cargo.

BACKGROUND OF THE INVENTION

The overwhelming majority of all overseas cargo is presently transported by ship. As compared to the transport of overseas cargo via conventional high altitude, high-speed aircraft, overseas cargo transport via ship is often 4 to 5 times slower but less expensive by a factor of ten. As such, only about one percent of all overseas cargo is time sensitive enough to necessitate shipment via conventional air transport. Given the gaps in the cost and transit time between ships and conventional air transport, there is an apparent need in the art for an alternative transport vehicle that facilitates the relatively efficient, rapid and cost-effective overseas transport of cargo.

Large airships or blimps represent one alternative mode of overseas transportation. Large airships have a higher payload-to-drag ratio than conventional aircraft and as such, are more efficiently operated. However, considerations for the size of the hanger for housing the airship, the stresses on the airship structure, the maneuverability of the airship, the airship's relatively slow cruising speed and the dependence on weather conditions render airships impractical for reliable overseas cargo transport.

Another alternative to the conventional overseas cargo transport modes is the conventional ground-effect aircraft. Ground-effect operation occurs when an aircraft is flown in close proximity to the surface of the earth such that the downward motion of the air under the aircraft is constrained. The constraint of the air under the aircraft reduces induced drag and thereby increases the efficiency of the aircraft. Conventional ground effect aircraft, however, are not well suited for the overseas transport of a high volume of cargo. In this regard, no ground-effect aircraft is known to have a configuration which permits safe ground-effect operation over rough seas as a typical altitude for ground-effect flight is about 0.1 wingspan lengths or less. Accordingly, large swells could prevent operations or necessitate alternative routes which would tend to increase costs and disrupt delivery schedules.

Furthermore, when the known ground-effect aircraft are scaled up in size to accommodate high volume cargo transport, several problems are encountered. For those ground-effect aircraft that take off and land in water, the fuselage of the aircraft is configured to permit flotation while the aircraft is fully loaded. As such, the hull or fuselage of the aircraft necessarily has a large area for displacing a sufficient volume of water to permit floatation. The large area of the hull, however, increases both the weight of the aircraft and its parasite drag to thereby reduce the aircraft's capacity and operational efficiency. Similarly, scaling-up the design of a conventional ground-effect aircraft that is configured to take off and land on conventional land-based runways is also impractable. For example, the large wingspan that is required to permit the aircraft to efficiently transport a high volume of cargo and the magnitude of the load that is exerted by the landing gear onto the runway would significantly limit the number of runways from which the aircraft could be operated.

Accordingly, there remains a need in the art for a ground-effect aircraft that is configured to permit the relatively efficient, rapid and cost-effective overseas transport of cargo.

SUMMARY OF THE INVENTION

In one preferred form, the present invention provides an aircraft having a fuselage, a wing assembly, an altitude control system and a plurality of independent and steerable landing gear units. The fuselage defines a central storage cavity having a length of at least 100 feet, a height of at least 16 feet and a width of at least 24 feet. The wing assembly extends through and is coupled to the fuselage in an unswept manner to provide the aircraft with a wingspan of at least 300 feet. The wing assembly defines a pair of wing storage cavities each of which being located on an opposite side of the fuselage. The wing assembly has a moderate aspect ratio of at least 3.5 to permit the aircraft to be flown efficiently in and out of ground effect. The altitude control system controls the altitude of the aircraft when the aircraft is flown in ground effect. The altitude control system is operable in an active mode for maintaining an altitude of the aircraft at about a predetermined altitude above a surface over which the aircraft is traveling. The landing gear units are coupled to the fuselage, and may be arranged in an irregular manner or in a matrix having, for example, regularly spaced rows and columns of individual landing gear units. The central storage cavity and the wing storage cavities are configured to receive a cargo that includes intermodal re-usable cargo containers.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

FIG. 10 is a partially broken away perspective view of a portion of the ground-effect cargo transport aircraft of FIG.

1 illustrating the nose portion of the fuselage in a rotated condition relative to the fuselage body.

DETAILED DESCRIPTION OF THE PREFERRED EMBODIMENTS

Figure 1:
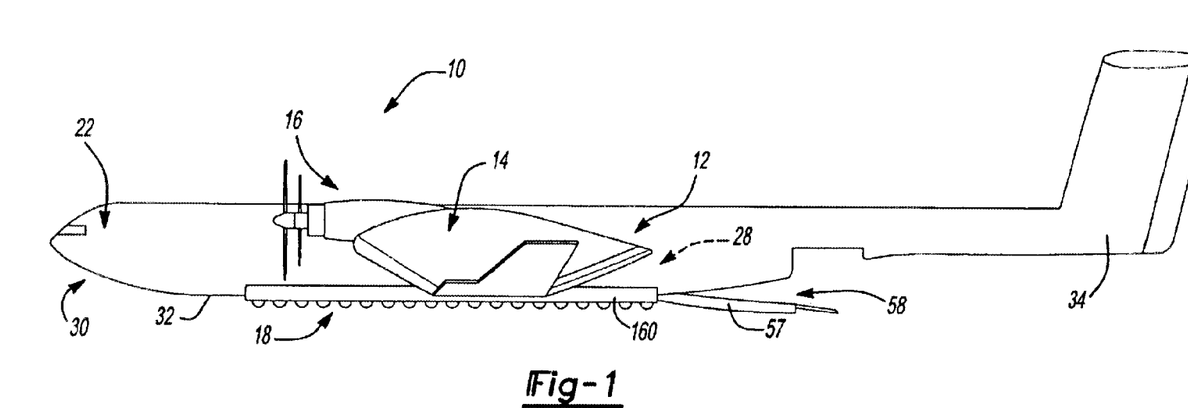
FIG. 1 is a side view of a ground-effect cargo transport aircraft constructed in accordance with the teachings of the present invention.
Figure 2:
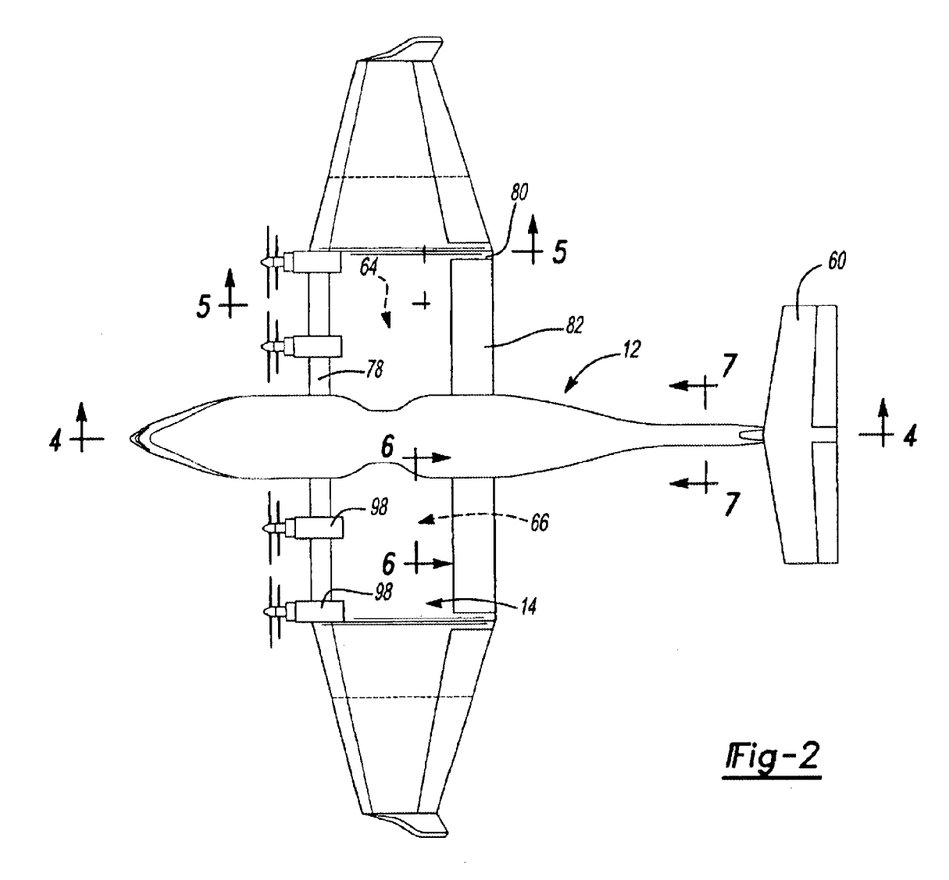
FIG. 2 is a plan view of the ground-effect cargo transport aircraft of FIG. 1.

With reference to FIG. 1 of the drawings, a ground-effect cargo transport aircraft constructed in accordance with the teachings of the present invention is generally indicated by reference numeral 10. The aircraft 10 is illustrated to include a fuselage 12, a wing assembly 14, a propulsion system 16, a landing gear system 18.

The aircraft 10 is extremely large in size, being approximately twice as big and six times as heavy as any other aircraft that is presently in existence. The aircraft 10 has a length of at least 100 feet and a wingspan of at least 300 feet. In the example provided, the aircraft has a length of 420 feet and a wingspan of 480 feet. The large size of the aircraft 10 tends to reduce operating costs by improving the aerodynamic efficiency of the aircraft 10 in ground-effect operation and reducing labor cost per unit of cargo transported, for example.

Figure 4:
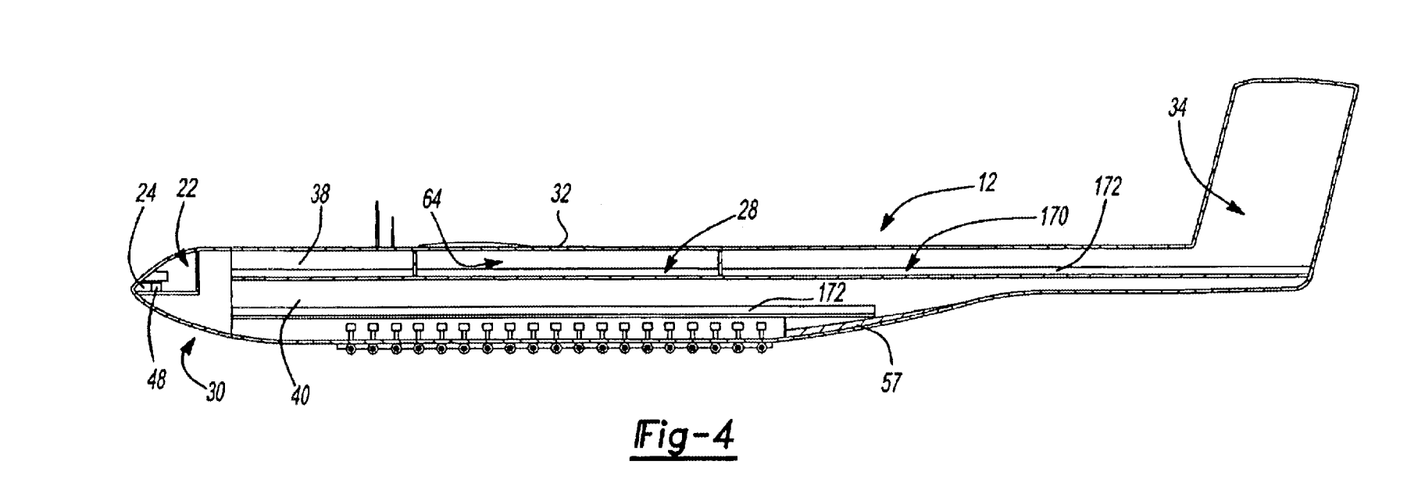
FIG. 4 is a cross-sectional view taken along the line 4—4 of FIG. 2.

Structural efficiency factors into the operating cost of any aircraft, since weight capacity that is not allocated to the structure of the aircraft is potentially available for cargo. In this regard, the extreme size of the aircraft 10 tends to reduce the proportion of weight that is typically allocated to fixed-weight components, such as the cockpit 22 and the avionics system 24, which are shown in FIG. 4, as well as reduces the extent to which components are built to a "minimum gauge". The extreme size of the aircraft tends to increase the proportion of weight typically allocated to structure subjected to bending loads, notably the wing structure. Certain features of the design reduce this weight including an unswept wing planform, great wing thickness to chord ratio, and spanwise cargo loading.

Figure 10:
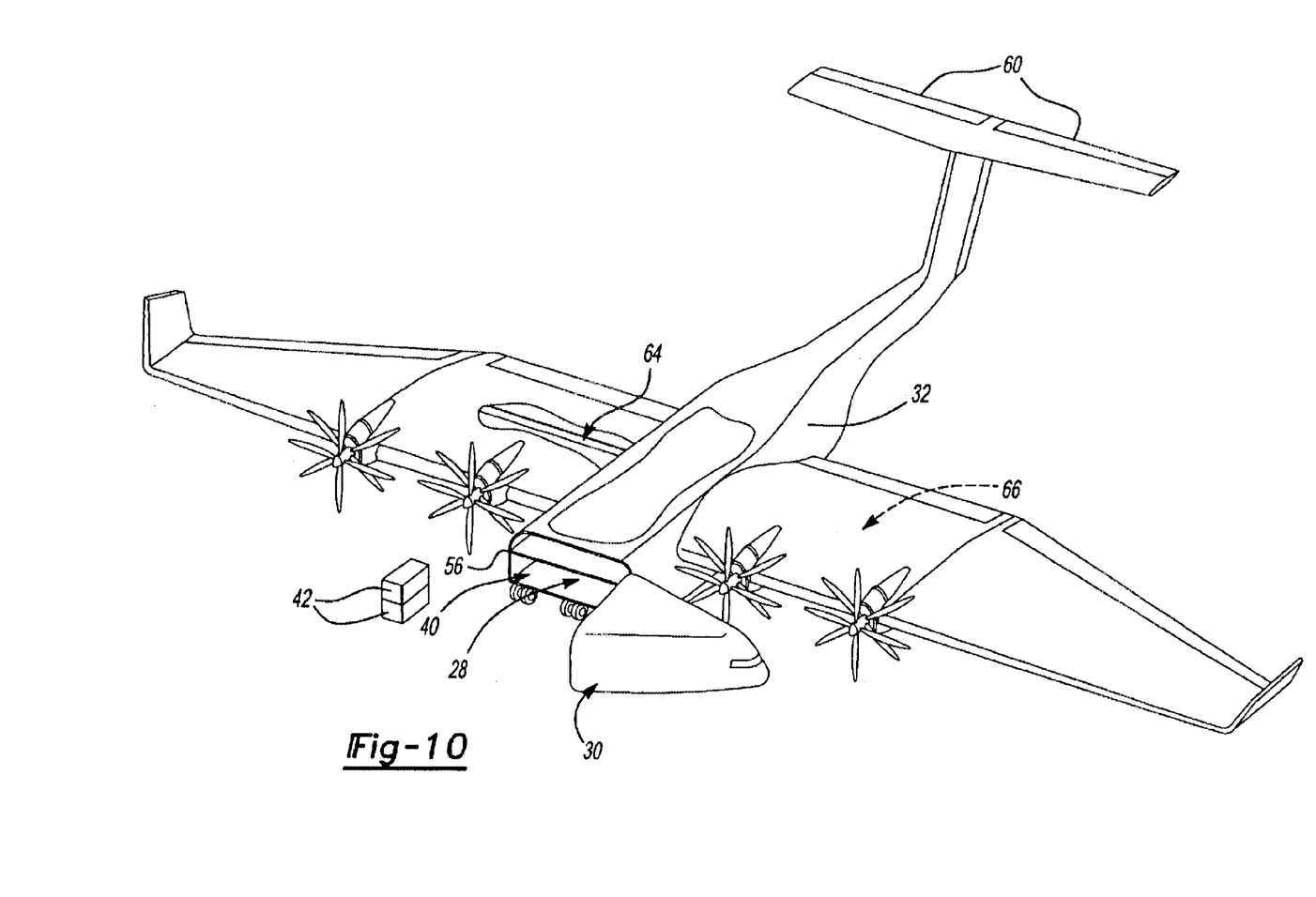

With reference to FIGS. 1 and 4, the fuselage 12 defines a central storage cavity 28 and includes the cockpit 22, a nose portion 30, a fuselage body 32 and a tail portion 34. The central storage cavity 28 extends approximately the entire length of the fuselage 12 and is at least 100 feet in length, at least 16 feet in height and at least 24 feet in width. In the embodiment illustrated, the central storage cavity 28 is segregated into two discrete storages cavities, an upper fuselage storage cavity 38 and a lower fuselage storage cavity 40, in order to facilitate the transport of cargo that includes intermodal re-usable storage containers, such as the commonly used 8×8×20 or 40 foot ISO containers. Those skilled in the art will understand, however, that the central storage cavity 28 may be constructed somewhat differently, particularly if large cargo, such as smaller planes or military equipment, such as tanks, are to be transported. Preferably, at least one of the upper and lower fuselage storage cavities 38 and 40 are configured with a height that permits the intermodal re-usable storage containers 42 to be stacked vertically on one another so as to permit cargo to be very densely packed into the fuselage 12 as illustrated in FIG. 10. The ability to densely pack cargo into the fuselage 12, and the ability to store cargo in the wing assembly 14 permit the fuselage 12 to have a relatively small size relative to the aircraft 10 as compared with conventional long range aircraft. The relatively small size of the fuselage 12 permits the aircraft 10 to operate with greater efficiency due to a reduction in drag.

The cockpit 22 is preferably pressurized to permit the aircraft 10 to be flown at relatively high altitudes as well as in low altitude ground-effect. The cockpit 22 includes the avionics system 24, as well as an altitude control system 48. The altitude control system 48 is operable in an active mode for maintaining an altitude of the aircraft 10 at approximately a predetermined altitude above the surface over which the aircraft 10 is flying. As those skilled in the art will appreciate, precise altitude control is essential for maximizing the benefit of ground-effect operation. With additional reference to FIG. 8, the altitude control system 48 preferably includes a sensor array 50 having a plurality of sensors 52 that are located along the length of the wing assembly 14 and the fuselage 12 to facilitate accurate altitude calculation, even over relatively rough terrain. The sensors 52 may include radar altimeters, laser altimeters, cameras, and/or any other suitable altitude sensing devices. The sensors 52 provide an altitude signal that is indicative of their altitude above the surface over which they are positioned. The altitude signals are received by a controller 53 which preferably averages the signals to determine an average altitude of the aircraft 10 and controls the operation of the aircraft 10 in response thereto to maintain the altitude of the aircraft 10 at about the predetermined altitude. While some type of signal filtering may be employed to calculate the altitude of the aircraft 10, it is presently preferred that a multiplicity of sensors 52 be employed over the length and span of the aircraft 10 so as to reduce signal filtering so as to reduce the time delay that is associated with the calculation of the altitude.

The altitude control system 48 may also be configured to calculate a bank angle and actively control the aircraft 10 so as to prevent the wing assembly 14 from contacting the surface of the earth during a roll maneuver. Alternatively, the altitude control system 48 may be configured to warn the pilot when a roll maneuver will cause the wing assembly 14 to contact the surface of the earth.

To facilitate the loading and unloading of cargo into the central storage cavity 28, the nose portion 30 is preferably movably mounted to the fuselage body 32, as shown in FIG. 10. In the example provided, the nose portion 30 is hingedly coupled to the fuselage body 32 and movable between a closed condition (FIG. 1), wherein the nose portion 30 is axially aligned and sealed to a front end 56 of the fuselage body 32, and an open condition (FIG. 10), wherein the nose portion 30 is swung toward a side of the fuselage body 32 to provide access to the central storage cavity 28 via the front end 56 of the fuselage body 32.

To further facilitate the loading and unloading of cargo, the fuselage 12 also includes an aft cargo door 57 that is pivotably mounted to the fuselage body 32 and movable between an elevated condition (FIG. 4), wherein the aft cargo door 57 closes an aft cargo aperture 58, and a lowered condition (FIG. 1), wherein the aft cargo door 57 substantially clears the aft cargo aperture 58. When positioned in the lowered condition, the aft cargo door 57 may be employed as a ramp to facilitate the loading of cargo into the central storage cavity 28. In the embodiment illustrated, the aft cargo door 57, when positioned in the lowered condition, is configured to permit the movement of cargo onto and off of the lower fuselage storage cavity 40.

The tail portion 34 is preferably T-shaped, having one or more horizontal stabilizers 60 to provide pitch, trim, stability and control for the aircraft 10 during flight operations and sufficient control power for takeoffs and landings. When the aircraft 10 is operated in ground-effect, the wing assembly 14 creates less downwash for the horizontal stabilizers 60 to operate in. Accordingly, the horizontal stabilizers 60 are mounted well aft and relatively high where the downwash is less severe than the downwash that is close to the wing assembly 14. Construction in this manner may permit the size and weight of the horizontal stabilizers to be reduced.

With reference to FIGS. 2 and 4 through 6, the wing assembly 14 is shown to extend through the fuselage 12 and define a first wing storage cavity 64 and a second wing storage cavity 66 for additional cargo storage. The structure or wingbox 68 of the wing assembly 14 is preferably an approximately rectangular box that is formed by a horizontal upper wing panel 70, a horizontal lower wing panel 72, and vertical shear webs 74 and 76 that are located at the front and rear sides, respectively, of the wingbox structure 68. The wing assembly 14 also includes a pair of curved leading edge panels 78, a plurality of aft wedges 80 and a plurality of control surfaces 82 that cooperate to provide the wing assembly 14 with an aspect ratio of between 3.5 and 8, and more preferably of about 6. Although the leading edge panels 78, the aft wedges 80 and the control surfaces 82 arguably add some strength and rigidity to the wingbox structure 68, they perform primarily aerodynamic functions. Configuration of the wing assembly 14 with a moderate aspect ratio (i.e., an aspect ratio that is between that which is typically employed for conventional long-range aircraft and that which is typically employed for conventional ground-effect aircraft) permits the aircraft 10 to be flown efficiently out of ground-effect at relatively high altitudes so as to permit the use of the aircraft 10 on overland routes, operate from land-based airports and fly over inclement weather.

The wing assembly 14 is preferably configured in an unswept manner, being relatively deep and having a relatively high wing thickness-to-chord ratio so as to better resist the bending moment that is generated during the operation of the aircraft 10. The unswept configuration reduces the structural span of the aircraft 10 relative to conventional long-range aircraft to reduce the moment that is applied to the wing assembly 14 during the operation of the aircraft 10. Aircraft that are configured with deeper wings tend to weigh less because wing depth provides structural leverage against wing bending. As such, when the aircraft 10 is compared with conventional long-range aircraft, the wing assembly 14 is very deep relative to the wing cord. High thickness-to-chord provides volume inside the wing that is sufficiently sized to house intermodal cargo containers.

The wingbox structure 68 of the aircraft 10 extends through the fuselage 12 such that the horizontal lower wing panel 72 intersects and is approximately coplanar with the floor 86 of the upper fuselage storage cavity 38 and the horizontal upper wing panel 70 intersects the ceiling 88 of the upper fuselage storage cavity 38. Construction in this manner is advantageous in that it permits cargo to be moved smoothly from the upper fuselage storage cavity 38 to the first and second wing storage cavities 64 and 66. In contrast to the conventionally designed aircraft, the wingbox structure 68 preferably does not include any vertical shear webs to support the portions of the upper and lower wing panels 70 and 72 that extend into the central storage cavity 28. Construction in this manner is possible since there is no shear between the fuselage sidewalls when the aircraft is loaded symmetrically in a side-to-side direction. In practice, asymmetrical loading is not always possible. Some additional and/or less efficient structure may be required.

Conventionally designed aircraft also typically include a series of ribs that span across the inside of the wingbox to increase the strength and rigidity of the wingbox in an efficient manner. In contrast, these internal ribs are not employed in the portion of the wingbox structure 68 where the first and second wing storage cavities 64 and 66 are located or at the intersection between the sides of the fuselage 12 and the wingbox structure 68 so as to permit the movement of cargo between the central storage cavity 28 and the first and second wing storage cavities 64 and 66. Accordingly, some additional and/or less efficient structure may be required.

Figure 3:
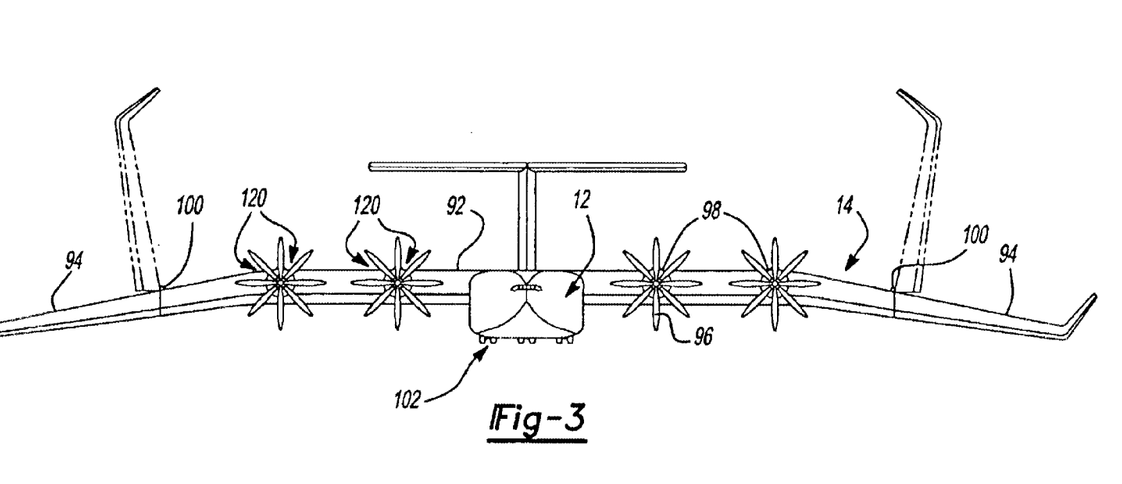
FIG. 3 is a front view of the ground-effect cargo transport aircraft of FIG. 1.

With reference to FIG. 3, the wing assembly 14 is shown to be constructed in a drooping manner wherein the wing assembly 14 extends outwardly and downwardly from the sides of the fuselage 12. In the embodiment illustrated, the wing assembly 14 includes a main or body portion 92, which is fixedly coupled to and extends through the fuselage 12, and a pair of tip portions 94 that are coupled to the distal ends of the body portion 92. The drooping construction of the wing assembly 14 is a compromise between the idealized wing location and concerns for the integration of the propulsion system.

In contrast to the configuration of the illustrated embodiment, the idealized wing for this embodiment intersects the fuselage at a relatively low point so that the wing assembly is able to operate as close to the surface of the ground as possible. As the propulsion system 16 for the illustrated embodiment is best configured with propellers 96 since ground effect flight dictates moderate cruise speeds, the use of wing-mounted nacelles 98 would cause the propellers 96 to extend below the wing surface and would become the lowest part of the aircraft. This would reduce the ground-effect benefit, since the aircraft would have to be flown at a higher altitude in order to maintain an acceptable level of ground clearance to the lowest point of the aircraft (i.e., the propellers). Alternatively, pylons could be employed to mount the nacelles above the wing assembly, but as those skilled in the art will readily understand, the use of pylons exacts a significant penalty, both in terms of weight and in aerodynamic performance.

The droop wing configuration of the wing assembly 14 permits the nacelles 98 to be mounted to the wing assembly 14 with sufficient ground clearance for the propellers 96 without the use of pylons. The droop or downwardly and outwardly extending shape of the body portion 92 and tip portions 94 permits a large portion of the wing of the aircraft 10 to be as low as possible relative to the fuselage 12 such that much of the benefit that is provided from the idealized wing configuration is maintained.

In the example provided, the tip portions 94 are preferably movably mounted to the body portion 92 such that each of the tip portions 94 is movable between an extended condition (shown in solid line) and a retracted condition (shown in phantom line). In the particular embodiment illustrated, each tip portion 94 is pivotably coupled to the body portion 92 via a hinge mechanism 100. Placement of the tip portions 94 in the retracted condition, wherein each tip portion 94 is rotated upwardly relative to the body portion 92, reduces the overall length of the wing assembly 14 (i.e., the wingspan of the aircraft 10) in appropriate situations (e.g., during take-off and landing or during ground operations such as loading and unloading) and to reduce the amount by which the wing assembly "droops". The size of the tip portions 94 is dependent upon the extension of the landing gear units 102 and the degree to which the wing assembly 14 droops. If the droop occurs primarily near the distal ends of the wing assembly 14, a relatively short tip portion 94 will provide sufficient clearance. If, however, each of the opposite sides of the wing assembly 14 are relatively flat, then the tip portion 94 will be relatively large.

Although the tip portion 94 of the wing assembly 14 is illustrated as being rotatable through an angle of about 90°, those skilled in the art will appreciate that the tip portions 94 could be configured in numerous other ways. For example, the tip portions 94 could be pivotably coupled to the distal ends of the body portion 92 and rotatable through a relatively small angle, e.g., 30°, such that the tip portions 94, when retracted, extend about as far downward as the distal ends of the wing assembly 14 (i.e., the tip portions 94 are rotated upwards just enough to cancel-out their droop). While configuration in this manner lacks some of the benefits of the above-discussed configuration, it none the less eliminates the need for highly extended landing gear. Another configuration includes a drive mechanism that draws the tip portion into and out from a cavity in the distal end of the body portion 92. The retraction and extension of the tip portions 94 would be along an axis that is approximately parallel the longitudinal axis of the wing assembly 14.

As is known in the art, ground-effect aircraft commonly experience a phenomenon known as "suck-down" wherein the airflow between the aircraft and the earth accelerates, causing the pressure of the air beneath the aircraft to decrease, resulting in a loss of altitude. This effect can become increasingly severe at lower altitudes as the effect tends to propagate and suck the aircraft down until it collides with the surface of the earth. To combat suck-down, the aircraft 10 is configured with an anti-suck down shape. In this regard, the shape of the exterior of the aircraft 10 is configured such that convex shapes on the underside of the aircraft 10 which would normally promote airflow acceleration in an area close to the surface of the aircraft 10.

Figure 5:
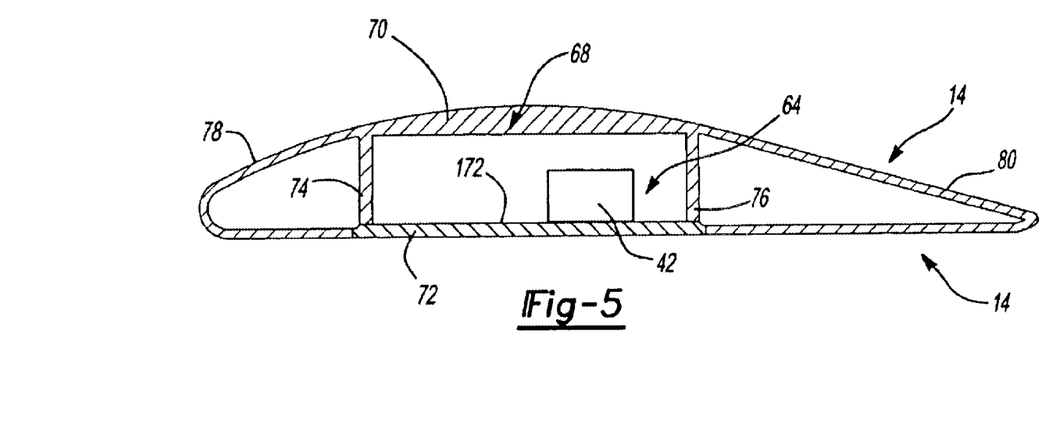
FIG. 5 is a cross-sectional view taken along the line 5—5 of FIG. 2.
Figure 6:
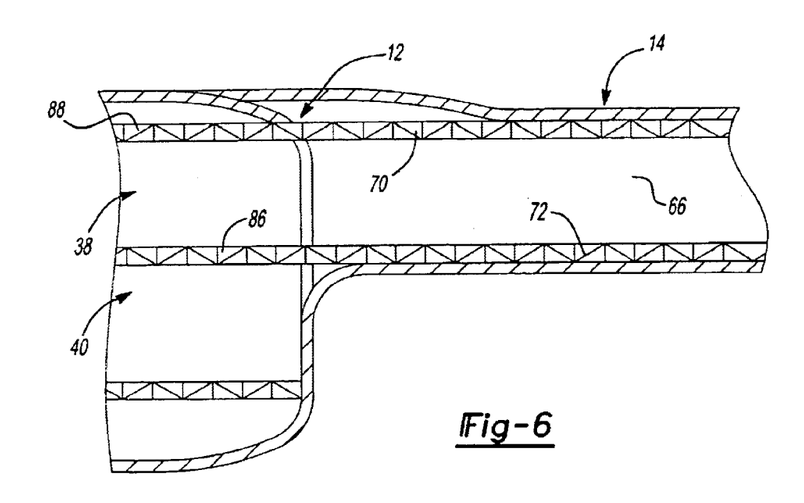
FIG. 6 is a cross-sectional view taken along the line 6—6 of FIG. 2.

The wing assembly 14, for example, is illustrated to include several anti-suck down features. As illustrated in FIG. 5, the wing assembly 14 is a substantially flat-bottomed air foil 110 that avoids convexity to thereby prevent airflow acceleration. Furthermore, the wing assembly 14 is configured with a wing scheme, as shown in FIG. 3, that uses tip droop to limit the distance by which a substantial portion of the wing assembly 14 can come to the surface of the earth.

Figure 7:
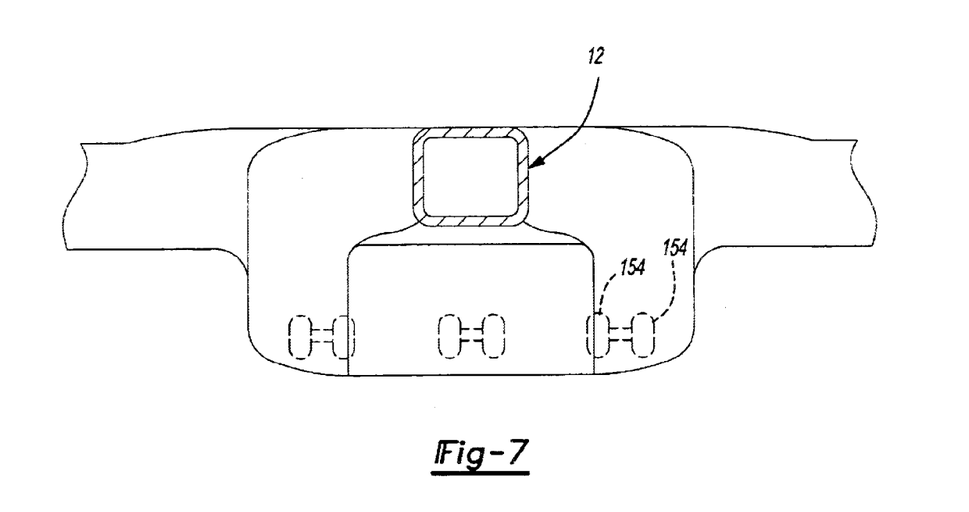
FIG. 7 is a cross-sectional view taken along the line 7—7 of FIG. 2.
Figure 8:
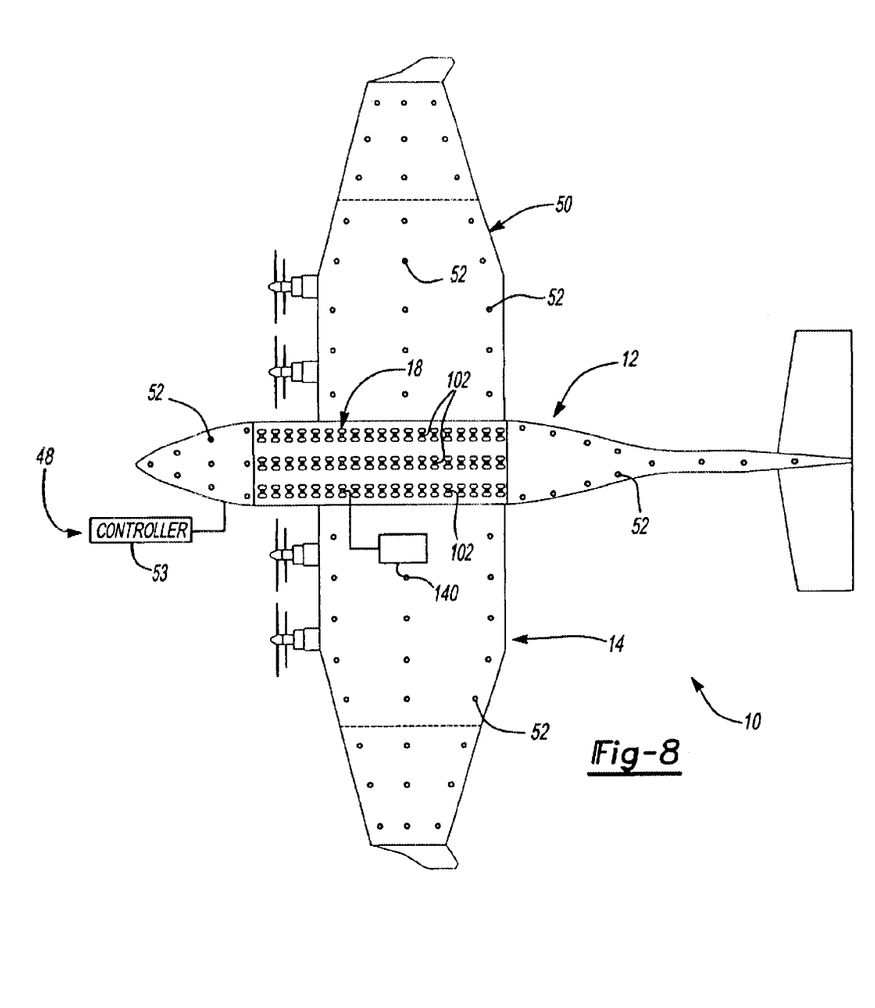
FIG. 8 is a bottom view of the ground-effect cargo transport aircraft of FIG. 1.

The nose portion 30 of the fuselage 12 is likewise drooped in side view so that the curvature of the underside of the fuselage is limited. This feature is enhanced by tapering the nose portion 30 more in the plan view (i.e., top view, see FIG. 2) than in the side view (see FIG. 4) so that less flow acceleration occurs on the underside of the fuselage 12. The aft end of the fuselage 12 is similarly limited in upsweep as shown in FIG. 4 so as to limit flow acceleration. Furthermore, the fuselage 12 is necked down as shown in FIGS. 7 and 8 to reduce the effective area subject to the suck-down effect. Lastly, the aft end of the fuselage 12 tapers more in the plan view (FIG. 2) rather than in the side view (see, e.g., FIGS. 1 and 4) which also limits flow acceleration beneath the airplane.

The "clean" overall design of the aircraft 10 promotes highly efficient flight, both in ground-effect and at higher altitudes. In this regard, the overall design features a low wetted area and smooth lines, as well as makes no provisions for the operation of the aircraft 10 in a water-borne environment. Consequently, efficiency-robbing features, such as pontoons, aft-facing steps, water rudders and chines, are not incorporated into the aircraft.

The aircraft 10, like a conventional aircraft, uses much more thrust to take off and climb than to cruise. The engines that are typically used for aircraft propulsion operate most efficiently when they are working at a fairly high fraction of their capacity. Conventional aircraft solve the problem of the engines' excess thrust capacity during cruise by cruising at relatively high altitudes. In contrast, the aircraft 10 is to be operated in ground-effect as well as at high altitudes and as such, a different strategy for reducing the thrust capacity is used. Accordingly, as shown in FIG. 3, the propulsion system 16 includes a plurality of engines 120 that are selectively controllable depending upon the demand for thrust. For example, at times when a large amount of thrust is needed, as when taking off, or when the capability for generating thrust is diminished, as when cruising at relatively high altitudes, the engines 120 are controlled such that they are all in an operational state and providing rotary power to rotate the propellers 96. When less thrust is needed, as when cruising in ground-effect, a first portion of the engines 120 may be turned off while a second portion of the engines 120 are operated at a near peak efficiency condition. On missions of relatively long duration, it is preferred that each portion of the engines 120 be alternatively operated and rested so as to permit an equal accumulation of hours of use on the engines 120.

Figure 11:
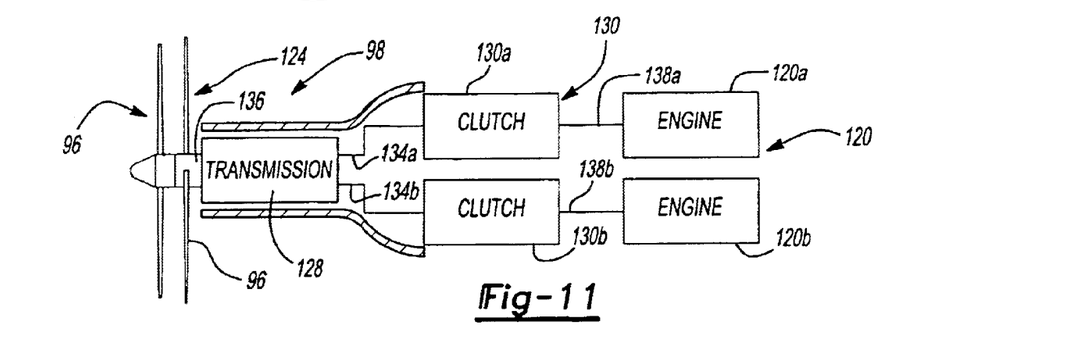
FIG. 11 is a schematic view of a portion of the ground-effect cargo transport aircraft of FIG. 1 illustrating the propulsion system in greater detail.

With additional reference to FIG. 11, the propulsion system 16 preferably includes a pair of the engines 120 which are incorporated into each of the wing-mounted nacelles 98. Wing-mounting is preferred as the connection between the engine nacelle is short and direct and is relatively simpler than that which is used for conventional long-range transport aircraft. Further, placement of the engines 120 along the span of the wing assembly 14 applies a force to the wing assembly 14 that tends to reduce the wing bending loads that are generated during flight.

The engines 120 are preferably employed to rotate a propeller cluster 124 having at least two propellers 96 that are disposed in a co-axial manner and which are operated in a counter-rotating manner that is well known in the art. Those skilled in the art will understand, however, that the propeller cluster 124 may alternatively include a single propeller 96 or two or more single-rotation propellers 96. The propeller cluster 124 is preferably located forward of the leading edge of the wing assembly 14 and somewhat outboard of the fuselage 12 so as to provide the propellers 96 with an inflow of air that is uniform in both speed and direction. In comparison, locations behind the wing assembly 14 or close to the fuselage 12 tend to have large variations in speed and/or direction of the inflow of air to the propellers. The counter-rotating propellers 96, which are two separate propellers that are spaced axially apart from one another and which rotate in opposite directions on a single axis, tend to be more efficient at higher speeds and be smaller in diameter than a comparable single propeller.

The engines 120 may be coupled to the propeller cluster 124 through a transmission 128 through an appropriate means, such as a gearbox, to provide a rotational input to the propeller cluster 124 as illustrated in FIG. 11. Configuration in this manner permits the engines 120 to be selectively uncoupled from the engines 120 as necessary so that the engines 120, when stopped, will not interfere with the rotation of the propellers 96. In this embodiment, the engines 120a and 120b are coupled to the transmission 128 via discrete clutches, such as clutch 130a and 130b, respectively. The transmission 128 is shown to include a pair of input shafts 134a and 134b and an output shaft 136. The clutch 130a is coupled to the output shaft 138a of the engine 120a and to the input shaft 134a of the transmission 128. The clutch 130a is operable in a first condition for transmitting a rotary output from the engine 120a to the input shaft 134a, and a second condition in which the output shaft 138a of the engine 120a and the input shaft 134a are not rotatably coupled (i.e., the output shaft 138a of the engine 120a and the input shaft 134a may rotate independently of one another). The clutch 130b similarly selectively couples the output shaft 138b of the engine 120b and the input shaft 134b to one another. The transmission 128 is operable for combining the rotary inputs from the input shafts 134a and 134b and transmitting a rotary output to the propeller cluster 124. In the particular embodiment illustrated, the transmission 128 includes a gearset that provides an appropriate level of speed reduction and torque multiplication.

Figure 12:
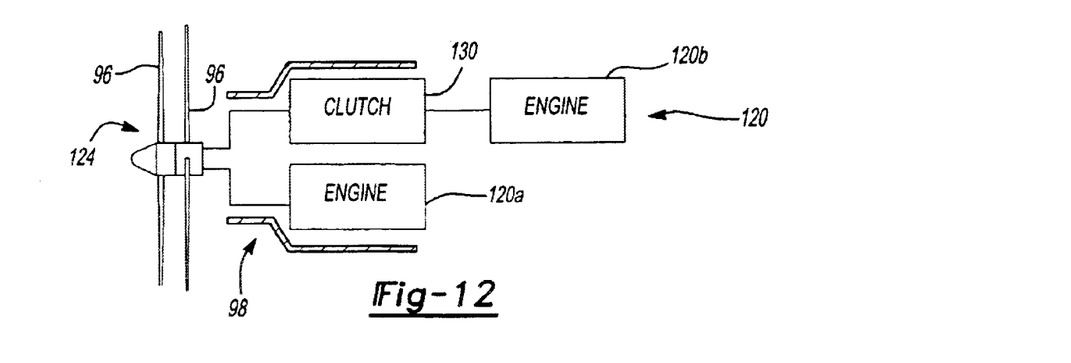
FIG. 12 is a schematic view similar to that of FIG. 11 but illustrating an alternate propulsion system.

Alternatively, as illustrated in FIG. 12, the propulsion system may be configured such that the engine 120a is directly coupled to the propeller cluster 124 and operable for driving the propellers 96 on a full-time basis. When additional thrust is required, the engine 120b is brought on-line and the clutch 130 is feathered in after the speed of its output is matched to that of the engine 120a to thereby permit the engine 120b to contribute to the production of thrust.

As the aircraft 10 is land-based, it operates from conventional airports with runways. It is therefore essential that the load of the aircraft 10 be distributed over a sufficiently large area so that the airport pavement is not overloaded. Preferably, the weight of the aircraft 10 is distributed over a large enough area so that the airport pavement will not be subjected to a higher level of stress than that which is created by the weight of a conventional commercial transport aircraft. To this end, a landing gear system 18 having a large number of widely dispersed landing gear units 102 is employed as shown in the example of FIG. 8. The landing gear system 18 includes at least twenty independently steerable landing gear units 102, which may be arranged in an irregular manner or in a matrix having regularly spaced columns and rows. In a presently preferred embodiment, the landing gear units 102 are arranged in at least two discrete columns and at least ten discrete rows and which are collectively controlled by a controller 140. In the particular embodiment illustrated, the landing gear system 18 includes 38 independently steerable landing gear units 102 that are arranged in two discrete columns and 19 discrete rows to distribute the load of the aircraft 10 over nearly the full length of the central storage cavity 28.

Figure 9:
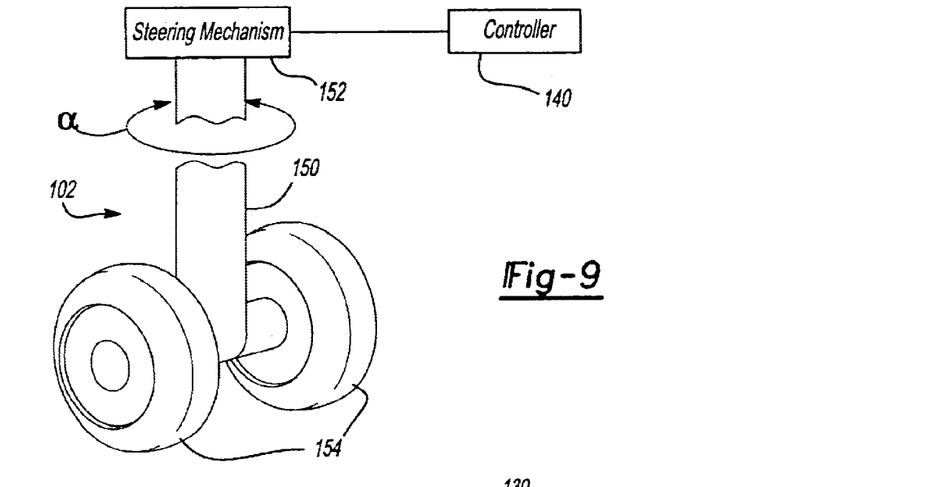
FIG. 9 is a schematic illustration of a portion of the ground-effect cargo transport aircraft of FIG. 1 illustrating the landing gear in greater detail.

With additional reference to FIG. 9, each landing gear unit 102 includes a strut portion 150, a steering mechanism 152 and a pair of individually suspended tires 154. Each landing gear unit 102 is configured to support the aircraft 10 against gravity at speeds at and below the minimum flying speed, distribute the weight of the aircraft 10, provide a low-friction interface between the aircraft 10 and the runway and taxiway surfaces over which it operates, provide braking following landing touchdown and during ground maneuvers, and absorb kinetic energy associated with the vertical movement of the tires 154 so as to limit the transmission of impact forces into the structure of the fuselage 12. The strut portion 150 is movably coupled to the structure of the fuselage 12 and is positionable between an extended position (FIG. 1) in which the tires 154 are suspended below the fuselage 12, and a retracted position (FIG. 7) in which the tires 154 are retracted into the fuselage 12. Pivoting doors 160 (FIG. 1) preferably shroud the landing gear units 102 when they are in the retracted position. The landing gear units 102 may also be configured such that they are fixed to the fuselage without provision for retraction. The pivoting doors 160 would shroud the landing gear units 102 when the airplane is in flight.

The steering mechanism 152 is configured to rotate the strut portion 150 through a predetermined angle I, which preferably is greater than or equal to 360°, without the need to stop or reverse. The steering mechanism 152 may include, for example, a spur gear (not shown) that is coupled to the strut portion 150, a pinion (not shown) that meshingly engages the spur gear, a drive mechanism (not shown) for rotating the pinion and a sensor (not shown) for generating a sensor signal indicative of the rotational orientation of the strut portion 150 relative to the fuselage 12. The independent suspension of the tires 154 on the strut portion 150 accommodates uneven or crowned airport surfaces while avoiding the concentration of load on individual landing gear units 102.

With the landing gear units 102 configured in this manner, the controller 140 is able to control the steering mechanisms 152 such that each pair of tires 154 may be steered with very little or no tire scrubbing, even during tight maneuvers. Further, the capability to individually steer all of the landing gear units 102 permits the aircraft 10 to land in or take-off from a crabbed orientation to thereby reduce the required roll clearance between the wing assembly 14 and the ground during landing and take-off operations. This reduction in roll clearance is preferably employed to lower the wing assembly 14 so as to further enhance the efficiency of ground-effect operation.

As the speed of transport is valuable, and as the time to load and unload the aircraft 10 is included in the total transit time, rapid loading and unloading of the aircraft 10 is highly desired. Features such as the movable nose portion 30 and the aft cargo ramp 57 undoubtedly reduce the cycle time associated with the loading and unloading of the aircraft 10, but the task of loading and unloading is preferably expedited through the use of a cargo transport system 170 as shown in FIG. 4.

As noted above, the preferred primary cargo of the aircraft 10 is the modular, intermodal ISO cargo containers that are commonly employed in overseas cargo transport. These containers are built the world over to a set of specifications which permits them to be functionally interchangeable with one another. The container design incorporates fittings at all eight corners that permit the containers to be securely locked to a vehicle or handled by cranes or other devices. Accordingly, the cargo transport system 170 is coupled to the fuselage 12 and preferably includes a conveyor portion 172 that is configured to facilitate loading and unloading of cargo into the central storage cavity 28, and preferably the first and second wing storage cavities 64 and 66 as well. The conveyor portion 172 preferably includes fittings (not specifically shown) that mate to the fittings on the ISO cargo containers to thereby lock the ISO cargo containers to the conveyor portion 172. The fittings may be of the type that are commonly employed in the transport of the ISO cargo containers by trucks and by rail. Such fittings are well known in the art and need not be discussed in detail herein.

Once an ISO cargo container 42 is secured to or removed from the conveyor portion 172, the conveyor portion 172 is indexed to permit another cargo container 42 to be loaded onto or removed from the conveyor portion 172. The conveyor portion 172 may be of any appropriate type, including a conventional synchronous conveyor system or a power-and-free accumulating type conveyor system, but preferably does not utilize auxiliary components, such as pallets, as the additional weight of such components reduces the cargo capacity of the aircraft 10.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. An aircraft comprising:
    a fuselage defining a central storage cavity, the central storage cavity having a length of at least 100 feet, a height of at least 16 feet and a width of at least about 24 feet;
    a wing assembly extending through and fixedly coupled to the fuselage in an unswept manner and providing the aircraft with a wingspan of at least 300 feet, the wing assembly defining a pair of wing storage cavities each of which being located on an opposite side of the fuselage, the wing assembly having a moderate aspect ratio of at least 3.5 to permit the aircraft to be flown efficiently in and out of ground effect;
    an altitude control system for controlling the altitude of the aircraft when the aircraft is flown in ground effect, wherein the altitude control system is operable in an active mode for maintaining an altitude of the aircraft at about a predetermined altitude above a surface over which the aircraft is traveling; and
    a plurality of independent and steerable landing gear coupled to the fuselage and operatively distributing the weight of the aircraft over substantially an entire length of the central storage cavity;
    wherein the central storage cavity and the wing storage cavities are configured to receive a cargo that includes intermodal re-usable cargo containers.

2. The aircraft of claim 1, wherein the wingspan is greater than about 100 feet.

3. The aircraft of claim 2, wherein the wingspan is greater than about 200 feet.

4. The aircraft of claim 1, wherein at least a portion of the wing assembly droops downwardly in a laterally outward direction, the laterally outward direction being taken from the fuselage to an associated tip of the wing assembly.

5. The aircraft of claim 4, wherein the wing assembly includes a wing body and a pair of wing tips, the wing body being fixedly coupled to the fuselage, the wing tips being, movably coupled to the opposite ends of the wing body and movable between an extended position, wherein the wing body and each of the wing tips are positioned in a generally horizontally aligned relation, and a retracted position.

6. The aircraft of claim 5, wherein the wing tips are hingedly coupled to the wing body.

7. The aircraft of claim 1, wherein at least a portion of the aircraft is configured with an anti-suck down shape.

8. The aircraft of claim 7, wherein the wing assembly is configured with a substantially flat-bottomed airfoil.

9. The aircraft of claim 7, wherein the wing assembly is configured with a droop wing dihedral wherein a tip portion of each of each end of the wing assembly effectively limits the aircraft from being lowered to an altitude that is within a suck-down altitude.

10. The aircraft of claim 7, wherein the fuselage includes a fuselage nose that is drooped in side view such that the curvature on the underside of an underside of the fuselage nose is limited.

11. The aircraft of claim 10, wherein the fuselage nose tapers more in plan view than in side view to limit flow acceleration on the underside of the fuselage nose.

12. The aircraft of claim 7, wherein the fuselage includes an aft fuselage portion that is configured with a limited upsweep to thereby limit flow acceleration.

13. The aircraft of claim 7, wherein the fuselage includes a necked-down portion that is configured to limit an area of the fuselage that is subject to a suck-down effect.

14. The aircraft of claim 1, further comprising a plurality of wing-mounted drive units, each of the drive units including a propeller cluster.

15. The aircraft of claim 14, wherein each propeller cluster includes a first propeller that is rotatable in a first rotational direction and a second propeller that is rotatable in a second rotational direction opposite the first rotational direction.

16. The aircraft of claim 14, wherein each propeller cluster includes a plurality of co-axial propellers and each drive unit includes at least one clutch mechanism, the at least one clutch mechanism being operable for selectively coupling at least one of the co-axial propellers to a source of rotational power.

17. The aircraft of claim 16, wherein each drive unit includes a plurality of engines that are combined into a single nacelle.

18. The aircraft of claim 14, wherein each propeller cluster includes a plurality of co-axial propellers and each drive unit includes a gearbox, a plurality of engines and at least one clutch mechanism, the gearbox including an input portion and an output portion, the input portion being configured to receive a rotational input from each of the engines, the output portion being configured to output a rotational output to each of the propellers, the clutch mechanism being operable for selectively coupling at least one of the engines to the input portion of the gearbox.

19. The aircraft of claim 18, wherein the clutch mechanism is operable in a first mode, wherein only a first one of the engines is coupled to the input portion, a second mode, wherein only a second one of the engines is coupled to the input portion, and a third mode, wherein both of the engines are coupled to the input portion.

20. The aircraft of claim 1, wherein the fuselage includes a pressurized cockpit.

21. The aircraft of claim 1, wherein each of the plurality of independently steerable landing gear are steerable through an angle of about 360 degrees.

22. The aircraft of claim 1, wherein the fuselage includes a nose portion and a fuselage body, the nose portion being hingedly coupled to the fuselage body.

23. The aircraft of claim 1, further comprising a transport system that is fixedly coupled to the fuselage and including a conveyor portion, the conveyor portion of the transport mechanism being configured to facilitate loading and unloading of cargo into the central storage and wing cavities.

24. The aircraft of claim 1, wherein the fuselage includes an aft T-tail.

25. The aircraft of claim 1, wherein the wing assemblies have an aspect ratio of about 6.0.

26. The aircraft of claim 1, wherein the wing assembly includes a wingbox structure that extends through the fuselage, the wingbox structure including a pair of vertically spaced-apart wing panels, the wing panels intersecting the central storage cavity and cooperating with an associated pair of floor structures to segregate the central storage cavity into an upper fuselage storage cavity and a lower fuselage storage cavity.

27. The aircraft of claim 26, wherein at least a portion of the wingbox structure that is disposed within the central storage cavity does not include a vertical shear web that connects the wing panels.

28. An aircraft comprising:
a fuselage defining a central storage cavity, the central storage cavity having a length of at least approximately 100 feet, a height of at least approximately 16 feet and a width of at least approximately 24 feet;
a wing assembly coupled to the fuselage and providing the aircraft with a wingspan of at least approximately 300 feet, the wing assembly defining a pair of wing storage cavities each of which being located on an opposite side of the fuselage, the wing assembly having a moderate aspect ratio sufficient to permit the aircraft to be flown in and out of ground effect;
a plurality of independent and steerable landing gear coupled to the fuselage and operatively distributing the weight of the aircraft over substantially an entire length of the central storage cavity; and
wherein the central storage cavity and the wing storage cavities are configured to receive a cargo that includes inter-modal re-usable cargo containers.

29. The aircraft of claim 28, wherein the wing assembly has a moderate aspect ratio of at least approximately 3.5.

30. The aircraft of claim 28, further comprising:
an altitude control system for controlling the altitude of the aircraft when the aircraft is flown in ground effect.

31. The aircraft of claim 30, wherein the altitude control system operates in an active mode to maintain an altitude of the aircraft at about a predetermined altitude above a surface over which the aircraft is traveling.

32. The aircraft of claim 30, wherein the central storage cavity comprises an upper fuselage storage cavity and a lower fuselage storage cavity.

33. An aircraft comprising:
a fuselage defining a central storage cavity, the central storage cavity having a length of at least approximately 100 feet and a width of at least approximately 24 feet;
a wing assembly extending coupled to the fuselage and providing the aircraft with a wingspan of at least approximately 300 feet, the wing assembly defining a pair of wing storage cavities each of which being located on an opposite side of the fuselage, the wing assembly having a moderate aspect ratio sufficient to permit the aircraft to be flown in and out of ground effect;
a plurality of independent and steerable landing gear coupled to the fuselage and operatively distributing the weight of the aircraft over substantially an entire length of the central storage cavity;
an altitude control system for maintaining the aircraft at a predetermined altitude above a ground surface over which the aircraft is traveling; and
wherein the central storage cavity and the wing storage cavities are configured to receive a cargo that includes inter-modal re-usable cargo containers.

34. The aircraft of claim 33, wherein the wing assembly has a moderate aspect ratio of approximately 3.5.

35. The aircraft of claim 33, wherein the central storage cavity comprises a height of at least approximately 16 feet.

36. An aircraft comprising:
a fuselage defining a central storage cavity, the central storage cavity having a length of at least approximately 100 feet, a height of at least approximately 16 feet, and a width of at least approximately 24 feet;
a wing assembly extending coupled to the fuselage and providing the aircraft with a wingspan of at least approximately 300 feet, the wing assembly defining a pair of wing storage cavities each of which being located on an opposite side of the fuselage, the wing assembly having a moderate aspect ratio sufficient to permit the aircraft to be flown in and out of ground effect;
a plurality of independent and steerable landing gear coupled to the fuselage and operatively distributing the weight of the aircraft over substantially an entire length of the central storage cavity; and
an altitude control system for maintaining the aircraft at a predetermined altitude above a ground surface over which the aircraft is traveling.

37. The aircraft of claim 36, wherein said central storage cavity and the wing storage cavities are configured to receive cargo that includes inter-modal re-usable cargo containers.

38. An aircraft comprising:
a fuselage defining a central storage cavity, the central storage cavity having a length of at least approximately 100 feet and a height of at least approximately 16 feet;
a wing assembly coupled to the fuselage and providing the aircraft with a wingspan of at least approximately 300 feet, the wing assembly defining a pair of wing storage cavities each of which being located on an opposite side of the fuselage, the wing assembly having a moderate aspect ratio sufficient to permit the aircraft to be flown in and out of ground effect;
a plurality of independent and steerable landing gear coupled to the fuselage and operatively distributing the weight of the aircraft over substantially an entire length of the central storage cavity; and
wherein the central storage cavity and the wing storage cavities are configured to receive a cargo that includes inter-modal re-usable cargo containers.

39. The aircraft of claim 38, wherein the central storage cavity has a width of approximately 24 feet.

40. The aircraft of claim 39, further comprising an altitude control system for maintaining the aircraft at a predetermined altitude above a ground surface over which the aircraft is traveling.

41. An aircraft comprising:
a fuselage defining a central storage cavity, the central storage cavity having a length of at least approximately 100 feet, a height of at least approximately 16 feet and a width of at least approximately 24 feet;
a wing assembly coupled to the fuselage and providing the aircraft with a wingspan of at least approximately 300 feet, the wing assembly defining a pair of wing storage cavities each of which being located on an opposite side of the fuselage, the wing assembly having a moderate aspect ratio sufficient to permit the aircraft to be flown in and out of ground effect; and
wherein the central storage cavity and the wing storage cavities are configured to receive a cargo that includes inter-modal re-usable cargo containers.

42. The aircraft of claim 41, further comprising a plurality of independent and steerable landing gear coupled to the fuselage and operatively distributing the weight of the aircraft over substantially an entire length of the central storage cavity.

43. The aircraft of claim 41, wherein the moderate aspect ratio comprises an aspect ratio of approximately about 3.5.

44. The aircraft of claim 41, further comprising an altitude control system for maintaining the aircraft at a predetermined altitude above a ground surface over which the aircraft is traveling.

45. The aircraft of claim 41, wherein the moderate aspect ratio comprises an aspect ratio no more than approximately 8.0.

46. An aircraft comprising:
- a fuselage defining a central storage cavity, the central storage cavity having a length of at least approximately 100 feet, a height of at least approximately 16 feet and a width of at least approximately 24 feet, the central storage cavity being adapted to accommodate a plurality of inter-modal, re-useable cargo storage containers;
- a wing assembly coupled to the fuselage and providing the aircraft with a wingspan of at least approximately 300 feet, the wing assembly defining a pair of wing storage cavities each of which being located on an opposite side of the fuselage, the wing assembly having an aspect ratio of at least approximately 3.5 to permit the aircraft to be flown in and out of ground effect; and
- a landing gear assembly for operatively distributing the weight of the aircraft over substantially an entire length of the central storage cavity during a landing maneuver.

47. The aircraft of claim 46, further comprising an altitude control system for enabling an altitude of the aircraft to be maintained at a predetermined altitude when the aircraft is flown in ground effect.

48. An aircraft comprising:
- a fuselage defining a central storage cavity, the central storage cavity having a length of at least approximately 100 feet, a height of at least approximately 16 feet and a width of at least approximately 24 feet;
- a wing assembly coupled to the fuselage and providing the aircraft with a wingspan of at least approximately 300 feet, the wing assembly having an aspect ratio between about 3.5 and 8.0 to permit the aircraft to be flown in and out of ground effect;
- wherein the central storage cavity has dimensions sufficient to receive a plurality of inter-modal, re-usable cargo containers in a vertically and laterally stacked orientation; and
- a plurality of independent and steerable landing gear coupled to the fuselage and operatively distributing the weight of the aircraft over substantially an entire length of the central storage cavity.

49. The aircraft of claim 48, wherein the wing assembly comprises a pair of wing storage cavities, each of which is located on an opposite side of the fuselage.

50. The aircraft of claim 48, further comprising an altitude control system for maintaining an altitude of the aircraft at a predetermined altitude while the aircraft travels over a ground surface.

* * * * *

UNITED STATES PATENT AND TRADEMARK OFFICE
CERTIFICATE OF CORRECTION

PATENT NO.         : 6,848,650 B2                                    Page 1 of 1
APPLICATION NO.    : 10/055411
DATED              : February 5, 2005
INVENTOR(S)        : Hoisington et al It is certified that error appears in the above-identified patent and that said Letters Patent is hereby corrected as shown below:

On the title page, item 54
First inventor's name should read -- Zachary C. Hoisington --

Signed and Sealed this

Twenty-fifth Day of July, 2006

JON W. DUDAS
*Director of the United States Patent and Trademark Office*

UNITED STATES PATENT AND TRADEMARK OFFICE
CERTIFICATE OF CORRECTION

PATENT NO. : 6,848,650 B2  Page 1 of 1
APPLICATION NO. : 10/055411
DATED : February 1, 2005
INVENTOR(S) : Hoisington et al.

It is certified that error appears in the above-identified patent and that said Letters Patent is hereby corrected as shown below:

On the title page, item 54,
First inventor's name should read -- Zachary C. Hoisington --

This certificate supersedes certificate of correction issued July 25, 2006.

Signed and Sealed this

Twenty-ninth Day of August, 2006

JON W. DUDAS
*Director of the United States Patent and Trademark Office*